(Model.)
W. PEARCE.
OX SHOE.
No. 284,888. Patented Sept. 11, 1883.
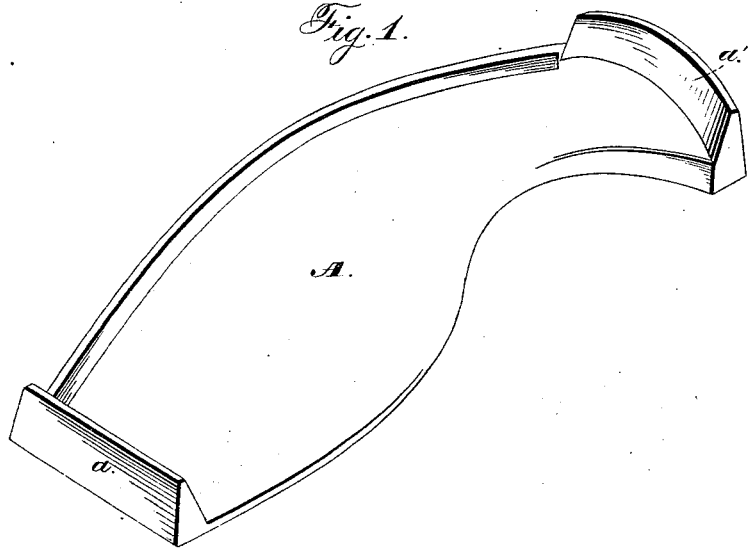
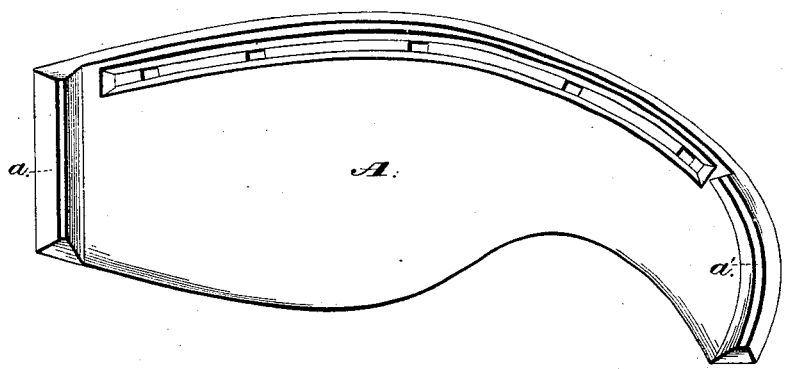
Witnesses:
Jas. E. Hutchinson.
Henry C. Hazard.
Inventor:
William Pearce.
by Prindle and Russell
Attorneys

UNITED STATES PATENT OFFICE.

WILLIAM PEARCE, OF PLANTSVILLE, ASSIGNOR TO HIMSELF, M. N. WOODRUFF, AND N. A. BARNES, OF SOUTHINGTON, CONN.

OX-SHOE.

SPECIFICATION forming part of Letters Patent No. 284,888, dated September 11, 1883.

Application filed May 8, 1883. (Model.)

*To all whom it may concern:*

Be it known that I, WILLIAM PEARCE, of Plantsville, in the county of Hartford and State of Connecticut, have invented certain new and useful Improvements in Ox-Shoes; and I do hereby declare that the following is a full, clear, and exact description thereof, reference being had to the accompanying drawings, making a part of this specification, in which—

Figure 1 is a perspective view of my improved shoe, and Fig. 2 is a plan view of the lower side of the same.

Letters of like name and kind refer to like parts in each of the figures.

In ox-shoes heretofore constructed the toe-calks have been straight, and have permitted the feet of animals shod with the same to slip laterally, more especially upon ice, and when, as is frequently the case, the animals are crowded together.

To obviate this difficulty and to afford a sure hold for the toe-calk is the design of my invention, which consists in an ox-shoe provided with a toe-calk that is formed upon a curved line, the chord of which is substantially parallel with the line of the heel-calk, substantially as and for the purpose hereinafter specified.

In the annexed drawings, A represents an ox-shoe which has the usual general form, and is provided at its heel with a calk, $a$, that is preferably straight and placed at a right angle to that portion of said shoe. At the front end of the shoe A is a toe-calk, $a'$, which is formed upon a curved line with its convex side outward. Said toe-calk is arranged with relation to the heel-calk $a$ so that the chord of the circle upon which the former is formed is substantially parallel with the line of said heel-calk and at a right angle to the line of draft. The toe-calk thus shaped and arranged furnishes a far stronger hold upon the ground or ice than could be obtained by the use of any other form, and entirely prevents lateral motion of the foot of the animal wearing the shoe, by which means greater confidence is felt by the wearer, better work is secured, and injuries which frequently result from slipping sidewise are prevented.

Having thus fully set forth the nature and merits of my invention, what I claim as new is—

An ox-shoe provided with a toe-calk that is formed upon a curved line the chord of which is substantially parallel with the line of the heel-calk, substantially as and for the purpose specified.

In testimony that I claim the foregoing I have hereunto set my hand this 23d day of April, 1883.

WILLIAM PEARCE.

Witnesses:
GEO. S. PRINDLE,
N. A. BARNES.